United States Patent
Kawaguchi

(10) Patent No.: US 7,921,421 B2
(45) Date of Patent: Apr. 5, 2011

(54) PROGRAM VERSION MANAGEMENT TAKING INTO ACCOUNT SYSTEM STABILITY

(75) Inventor: Takuji Kawaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1144 days.

(21) Appl. No.: 11/629,031

(22) PCT Filed: Apr. 21, 2006

(86) PCT No.: PCT/JP2006/008929
§ 371 (c)(1),
(2), (4) Date: Dec. 7, 2006

(87) PCT Pub. No.: WO2006/115290
PCT Pub. Date: Nov. 2, 2006

(65) Prior Publication Data
US 2008/0288935 A1    Nov. 20, 2008

(30) Foreign Application Priority Data

Apr. 25, 2005 (JP) .................................. 2005-126183
Mar. 24, 2006 (JP) .................................. 2006-082887

(51) Int. Cl.
*G06F 9/44* (2006.01)
(52) U.S. Cl. ....................... 717/170; 717/171
(58) Field of Classification Search ........... 717/168–178
See application file for complete search history.

(56) References Cited

U.S. PATENT DOCUMENTS

| 5,960,189 A * | 9/1999 | Stupek et al. ................ 717/169 |
| 6,035,423 A | 3/2000 | Hodges et al. |
| 6,269,456 B1 | 7/2001 | Hodges et al. |
| 2002/0184619 A1 | 12/2002 | Meyerson |
| 2004/0214599 A1 | 10/2004 | Ogino |
| 2005/0066023 A1 * | 3/2005 | Sakurai et al. ................ 709/223 |

FOREIGN PATENT DOCUMENTS

| JP | 2002-63098 | 2/2002 |
| JP | 2005-304263 | 10/2002 |
| JP | 2004-328239 | 11/2004 |
| JP | 2005-92803 | 4/2005 |

OTHER PUBLICATIONS

Dec. 8, 2008 search report in connection with a counterpart European patent application No. 06 74 5810.

* cited by examiner

*Primary Examiner* — Wei Y Zhen
*Assistant Examiner* — Chung Cheng
(74) *Attorney, Agent, or Firm* — Cooper & Dunham LLP

(57) ABSTRACT

A method of managing program versions by acquiring information about a program supplied via a network, comparing the program of a latest version with the program of a currently used version, and deciding whether or not to perform or prompt an update of the program includes determining whether or not to perform or prompt the update of the program in response to importance of modifications to be made from the program of the currently used version to the program of the latest version.

7 Claims, 3 Drawing Sheets

FIG.3

| | PLUS FACTOR RESULTING FROM MODIFICATION | | MINUS FACTOR RESULTING FROM MODIFICATION | | AMOUNT OF MODIFICATION |
|---|---|---|---|---|---|
| | IMPROVEMENT IN FUNCTIONALITY RESULTING FROM ADDITION OF FUNCTION | IMPROVEMENT IN STABILITY RESULTING FROM FIXING OF TROUBLE | RANGE AFFECTED BY MODIFICATION | AMOUNT OF MODIFICATION | |
| MODIFICATION 1 | 2 | 4 | 3 | 2 | 1 |
| MODIFICATION 2 | 5 | 3 | 4 | 2 | 2 |
| ... | ... | ... | ... | ... | ... |
| MODIFICATION N | 4 | 3 | 2 | 3 | 2 |
| IMPORTANCE OF MODIFICATIONS OF THIS MODULE | | | | | 5 |

PROGRAM VERSION MANAGEMENT TAKING INTO ACCOUNT SYSTEM STABILITY

TECHNICAL FIELD

This disclosure relates to a method, program, and print system for program version management.

BACKGROUND ART

For printers serving as printing apparatus, a printer driver is periodically released as a program for which new functions are added or troubles are fixed, so that a print system or information processing apparatus using such a printer needs to have a printer driver thereof updated to a new version on a regular basis.

In such a case, when the user is to update a printer driver to a newer version, the user needs to actively locate the newest software based on information available on the Internet or from manufacturers so as to download the software (program), followed by performing a version update. This is quite troublesome.

Japanese Patent Application Publication No. 2002-63098 discloses a host apparatus of a printer system, which acquires version information regarding the printer driver software currently used therein and the current printer firm of the printer apparatus connected thereto according to the operations of installed version-up software. The host apparatus also connects to the server of the printer maker via the Internet, and acquires the latest version information regarding the driver software and printer firm available on the server. If the printer driver software and printer firm that are currently installed are different in their version numbers from the latest printer driver software and printer firm provided by the maker, the latest printer driver software and/or printer firm are downloaded so as to perform a version update with respect to the driver software and/or printer firm.

In some cases, however, systems are designed based on the premise that a driver of a particular version is used. In such a case, if the newest printer driver is downloaded to perform an update simply upon the release of the newest printer driver as described above, the stability of the system may be undermined by the updating of the version of the driver.

Accordingly, there is a need for a program version management scheme which can improve system stability.

BRIEF SUMMARY

In an aspect of this disclosure, there is provided a program version management method, a computer medium having a program embedded therein for performing such a method, and a print system, by which the stability of the system can be improved.

In another aspect, there is provided a method of managing program versions by acquiring information about a program supplied via a network, comparing the program of a latest version with the program of a currently used version, and deciding whether or not to perform or prompt an update of the program includes determining whether or not to perform or prompt the update of the program in response to importance of modifications to be made from the program of the currently used version to the program of the latest version.

According to another aspect, a machine-readable medium has a program embedded therein for causing a computer to acquire information about a program supplied via a network, to compare the program of a latest version with the program of a currently used version, and to decide whether or not to perform or prompt an update of the program. The program includes a program code configured to determine whether or not to perform or prompt the update of the program in response to importance of modifications to be made from the program of the currently used version to the program of the latest version.

According to another aspect, a print system includes a print apparatus, and a plurality of apparatuses connected to the print apparatus, wherein each of the apparatuses is configured to acquire information about a program supplied via a network, to compare the program of a latest version with the program of a currently used version, and to determine whether or not to perform or prompt the update of the program in response to importance of modifications to be made from the program of the currently used version to the program of the latest version.

Since the update of a program or the process to prompt such an update is performed in response to the importance of modifications made from the program currently used to the latest-version program, it is possible to prevent the stability of the system from being undermined by the updating of the program.

BRIEF DESCRIPTION OF DRAWINGS

FIG. 3 is a drawing for explaining a specific example of the computation of importance of modifications.

BEST MODE FOR CARRYING OUT THE INVENTION

Figure 1:
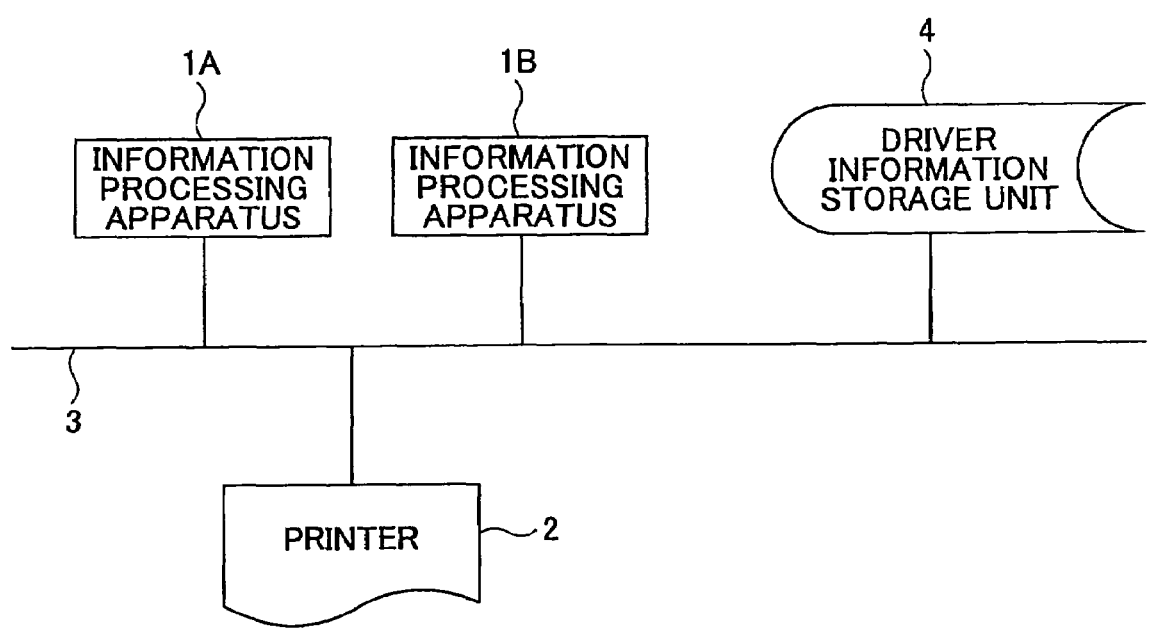
FIG. 1 is a block diagram for explaining an embodiment of the present invention.

In the following, embodiments of the present invention will be described with reference to the accompanying drawings. FIG. 1 is a block diagram showing an example of the print system according to the present invention.

This print system includes information processing apparatuses 1A and 1B such as a plurality of personal computers, a printer 2 serving as a print apparatus, and a network 3, which connects the information processing apparatuses 1A and 1B and the printer 2 to each other. On the network 3, further, a driver information storage unit 4 is provided that downloads the newest driver (program) of the printer 2 through the Internet or the like (not shown) for storage therein. The storing of the driver in the driver information storage unit 4 may be performed by the information processing apparatus 1A or the like, or may be performed another information processing apparatus (not shown).

Figure 2:
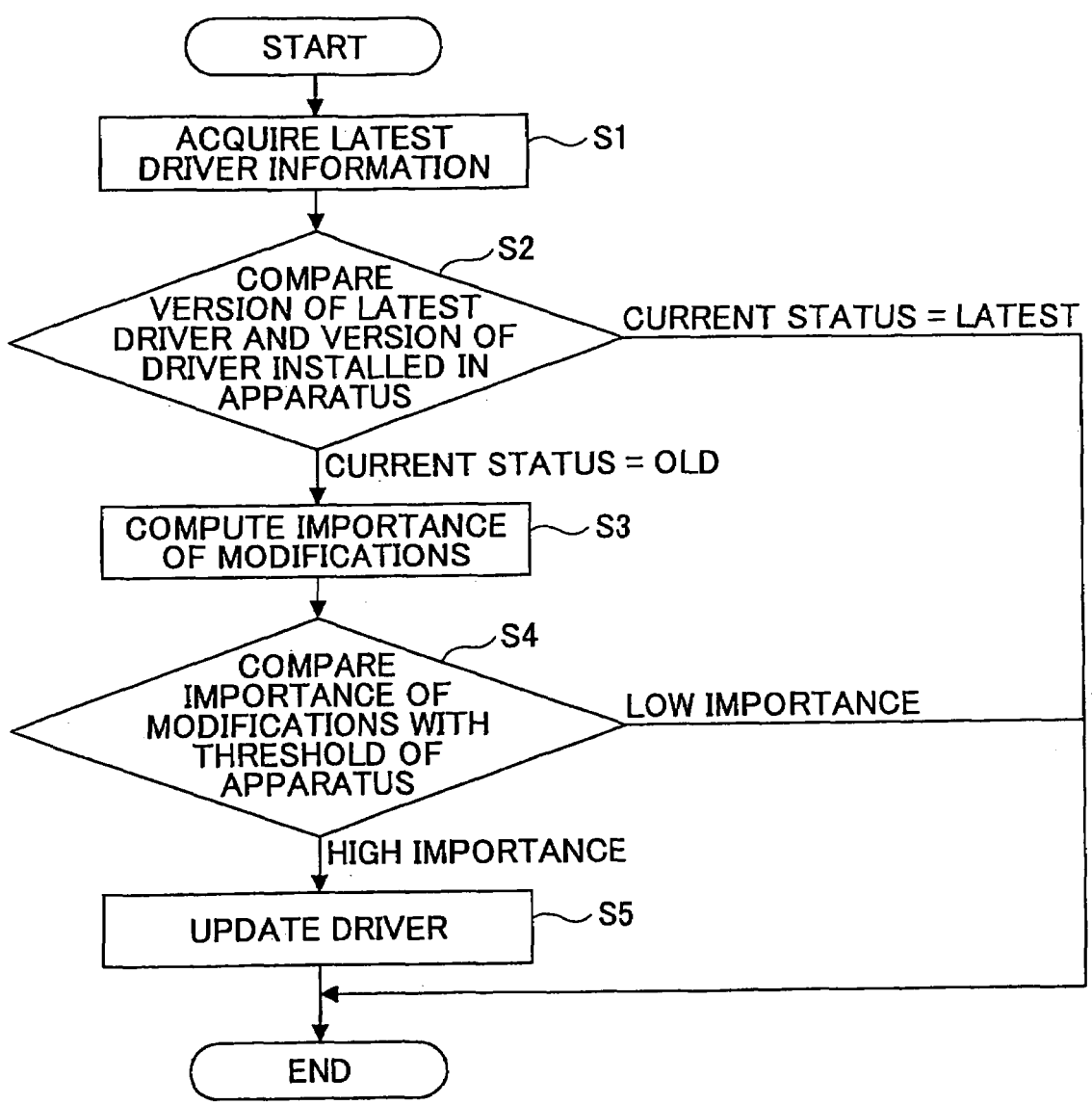
FIG. 2 is a flowchart showing the method of managing driver versions.

In the following, the driver version management method (driver updating process) in this print system will be described with reference to FIG. 2.

Each of the information processing apparatuses 1A and 1B acquires the latest driver information stored in the driver information storage unit 4 via the network 3 (step S1), and compares the version of the driver currently used with the latest version of the driver (step S2).

If the version of the driver currently used is the same as the latest version of the driver (current=latest), the procedure comes to an end. If the version of the driver currently used is older than the latest version of the driver (current=old), the process to compute the "importance of modifications" will be performed (step S3).

The "importance of modifications" includes "a plus factor resulting from a modification" and "a minus factor resulting from the modification" defined separately for each modification. The "plus factor resulting from a modification" includes "an improvement in functionality resulting from the addition of one or more functions" and "an improvement in stability resulting from the fixing of one or more troubles". The "minus factor resulting from a modification" includes "a range affected by the modification (i.e., the breadth of the affected range)" and "the amount of the modification (i.e., the possibility of being affected)". A level is assigned to each item described here.

The importance of each modification is computed as follows: the importance of modification n (n=1, . . . , or N)={(the level of an improvement in functionality resulting from the addition of one or more functions)+(the level of an improvement in stability resulting from the fixing of one or more troubles)}−{(the level of a range affected by the modification)+(the level of the amount of the modification)}. After computing the importance of each modification, the importance of modifications is computed as follows: the importance of modifications the importance of modification 1+the importance of modification 2+ . . . +the importance of modification N where the modifications actually made are modification 1, modification 2, . . . , and modification N.

Thereafter, the importance of modifications computed as described above is compared with the threshold of the apparatus (information processing apparatus) that is determined in advance (step S4). If the importance of modifications is larger than the threshold of the apparatus, i.e., if the importance is high, the driver is updated to the newest version (or a process to prompt the update is performed) (step S5). If the importance of modification is lower than or equal to the threshold of the apparatus, i.e., if the importance is low or compatible to that of the current state, the driver is not updated (or the process to prompt the update is not performed).

In the following, a description will be made of a specific example of the process of computing the importance of modifications with reference to FIG. 3. In this example, the assigned levels range from 1 to 5.

In this example, with respect to "modification 1", an improvement in functionality resulting from the addition of one or more functions is rated as level "2", and an improvement in stability resulting from the fixing of one or more troubles rated as level "4", with these improvements serving as the plus factors resulting from the modification. Further, a range affected by the modification is rated as "3", and the amount of the modification rated as "2", with these serving as the minus factors resulting from the modification. The importance of "modification 1" is thus level "1" (=2+4−3−2).

By the same token, with respect to "modification 2", an improvement in functionality resulting from the addition of one or more functions is rated as level "5", and an improvement instability resulting from the fixing of one or more troubles rated as level "3", with these improvements serving as the plus factors resulting from the modification. Further, a range affected by the modification is rated as "4", and the amount of the modification rated as "2", with these serving as the minus factors resulting from the modification. The importance of "modification 2" is thus level "2" (=5+3−4−2). Further, with respect to "modification N", an improvement in functionality resulting from the addition of one or more functions is rated as level "4", and an improvement in stability resulting from the fixing of one or more troubles rated as level "3", with these improvements serving as the plus factors resulting from the modification. Further, a range affected by the modification is rated as "2", and the amount of the modification rated as "3", with these serving as the minus factors resulting from the modification. The importance of "modification N" is thus level "2" (=4+3−2−3).

The importance of modifications derived by combining modifications 1, 2, and N is thus level "5". This level "5" is compared with the threshold of an apparatus to determine whether to perform a driver update process (or a process that prompts such an update) in response to the result of the comparison.

In this manner, the importance of modifications made from a given version to another version is quantified (represented by a numerical value) at the time of determining the necessity of a version update. This makes it possible to determine whether to perform a driver update based on the sum of the quantified importance values even if the version of the driver currently used and the latest version (newest version) do not have consecutive version numbers.

The threshold of apparatus may be set by users separately for each apparatus (information processing apparatus) by use of a user interface. This makes it possible to update a driver by taking into account stability required of the apparatus for which the update is to be performed, thereby improving the stability of the system.

Since the update of a program or the process to prompt such an update is performed in response to the importance of modifications made from the program currently used to the latest-version program, it is possible to prevent the stability of the system from being undermined by the updating of the program.

The embodiment described above is directed to an example in which the program to be updated is a printer driver. This is not a limiting example, and the program can be any program such as an application program.

Although the present invention has been described with reference to embodiments, the present invention is not limited to these embodiments, but various variations and modifications may be made without departing from the scope of the invention as set forth in the accompanying claims.

The present application is based on Japanese priority application No. 2006-082887 filed on Mar. 24, 2006, with the Japanese Patent Office, the entire contents of which are hereby incorporated by reference.

The invention claimed is:

1. A method performed by a management apparatus for managing program versions by acquiring information about a program supplied via a network, comparing a latest version of the program with a currently used version of the program, and deciding whether or not to perform or prompt an update of the currently used version of the program, said method comprising:

determining, by the management apparatus, whether or not to perform or prompt the update of the currently used version of the program, in response to an importance of modifications associated with changing the currently used version of the program to the latest version of the program, {(a level of an improvement in functionality resulting from the modifications)+(a level of an improvement in stability resulting from the modifications)}−{(a level of a range affected by the modifications)+(a level of an amount of the modifications)}; and wherein the importance of modifications is quantified and represented as a numerical value.

2. The method as claimed in claim 1, wherein the importance of modifications is compared with a threshold to determine whether or not to perform or prompt the update of the program, the threshold being settable.

3. The method as claimed in claim 1, wherein the program is a driver.

4. A non-transitory computer-readable medium having a computer program embedded therein for causing a computer to acquire information about a program supplied via a network, compare a latest version of the program with a currently used version of the program, and deciding whether or not to perform or prompt an update of the currently used version of the program, said computer program comprising:

a program code configured to determine whether or not to perform or prompt the update of the currently used version of the program, in response to an importance of modifications associated with changing the currently used version of the program to the latest version of the program, wherein the importance of modifications is computed as:

{(a level of an improvement in functionality resulting from the modifications)+(a level of an improvement in stability resulting from the modifications)}−{(a level of a range affected by the modifications)+(a level of an amount of the modifications)}; and wherein the importance of modifications is quantified and represented as a numerical value.

5. A print system, comprising;
a print apparatus; and
a plurality of apparatuses connected to the print apparatus, wherein each of the apparatuses is configured to acquire information about program supplied via a network, to compare a latest version of the program with a currently used version of the program, and to determine whether or not to perform or prompt the update of the currently used versions of the program, in response to an importance of modifications associated with changing the currently used version of the program to the latest version of the program, wherein the importance of modifications is computed as:

{(a level of an improvement in functionality resulting from the modifications)+(a level of an improvement in stability resulting from the modifications)}−{(a level of a range affected by the modifications)+(a level of an amount of the modifications)}; and wherein the importance of modifications is quantified and represented as a numerical value.

6. The method as claimed in claim 1, wherein the level of the range affected by the modifications indicates a breadth of a range of the currently used version of the program that is affected if the currently used version of the program is updated to the latest version of the program.

7. The method as claimed in claim 1, further comprising determining whether the currently used version of the program is equivalent to the latest version of the program, wherein the importance of modifications is only calculated if the currently used version of the program is not equivalent to the latest version of the program.

* * * * *

UNITED STATES PATENT AND TRADEMARK OFFICE
CERTIFICATE OF CORRECTION

PATENT NO.        : 7,921,421 B2                                        Page 1 of 1
APPLICATION NO.   : 11/629031
DATED             : April 5, 2011
INVENTOR(S)       : Takuji Kawaguchi It is certified that error appears in the above-identified patent and that said Letters Patent is hereby corrected as shown below:

Replace Item (86) on the Title page of the patent,
with the following:

Item -- (86) PCT No.: PCT/JP2006/308929 --

Signed and Sealed this
Twenty-eighth Day of June, 2011

David J. Kappos
*Director of the United States Patent and Trademark Office*